United States Patent

Busby et al.

[11] Patent Number: 5,865,456
[45] Date of Patent: Feb. 2, 1999

[54] BICYCLE FLEX JOINT WITH NON-TORSIONAL ENCASEMENT

[75] Inventors: James S Busby, Costa Mesa; Stanley A Needle, San Jose, both of Calif.

[73] Assignee: GT Bicycles, Inc., Santa Ana, Calif.

[21] Appl. No.: 699,807

[22] Filed: Aug. 19, 1996

Related U.S. Application Data

[63] Continuation-in-part of Ser. No. 662,249, Jun. 14, 1996, Pat. No. 5,797,613.

[51] Int. Cl.$^6$ .................................................. B62K 25/28
[52] U.S. Cl. ........................... 280/284; 267/30; 267/32.7; 280/283; 403/220; 403/291
[58] Field of Search .................................... 280/275, 276, 280/283, 284, 281.1; 403/291, 404, 200, 220, 223, 226, 179, 120; 267/30, 37.1, 37.2, 25, 154, 292, 294; 248/630, 622, 565, 601

[56] References Cited

U.S. PATENT DOCUMENTS

| D. 372,002 | 7/1996 | Busby et al. ........................... D12/111 |
| 439,095 | 10/1890 | Becker . |

(List continued on next page.)

FOREIGN PATENT DOCUMENTS

| 092015477 | 9/1992 | European Pat. Off. . |
| 9313974 | 7/1993 | European Pat. Off. . |
| 033294 | 4/1981 | Germany . |
| 428442 | 12/1947 | Italy . |
| 457480 | 5/1950 | Italy . |
| 5105168 | 5/1993 | Japan . |
| 897432 | 3/1985 | Russian Federation . |
| 7430 | of 1914 | United Kingdom . |
| 15332 | 9/1916 | United Kingdom . |
| 220760 | 8/1924 | United Kingdom . |
| 2084456 | 4/1982 | United Kingdom ................ 297/354.1 |

OTHER PUBLICATIONS

Mountain Bike Action; "Beating Around the Bush"; Oct. 1992; pp. 10, 25–26, 28–29, 31, 36–37, 39–41, 44–45, 47, 58, 70, 73, 76–79, 123 and 130.
Bicycling; Nov. 1992; pp. 26–27, 58, 63–64 and 105.
Mountain Biking; "Roaming the Halls of the Bike Industry, Picking Up Interesting Tidbits"; Nov. 1992, vol. 6; No. 11; pp. 6–9, 25, 48–49, 65, 71, 73, 108–109, 115,124, 129, 140, 143, 163 and 169.
Mountain Biking; Dec. 1992; pp. 1–2, 5, 18, 44–49, 77, 127 and 160.
Mountain Biking; "Pass Press 93"; Jan. 1993; vol. 7; No. 1; pp. 32–33, 40, 45, 71, 75, 82–83, 115 and 117.
Mountain Bike Action; "Welcome to the Next Generation"; Jun. 1992; 9 pgs.
Mountain Bike Action; "Schwinn S.A.S.S."; May 1992; 7 pgs.
Offroad; Offroad Pro–Flex 550; 3 pgs.
Mountain Bike Action; "Litespeed Suspension"; Jul. 1992; 6 pgs.
Mountain & Citing Biking; "Slingshot"; 6 pgs.

(List continued on next page.)

Primary Examiner—Anne Marie Boehler
Attorney, Agent, or Firm—Stetina Brunda Garred & Brucker

[57] ABSTRACT

A flex joint for a vehicle frame has a flexible member fabricated of a durable material and a body formed upon the flexible member. The body is configured to define a desired bending of the flexible member at a bending site which is surrounded by a longitudinally flexible, substantially non-twistable encasement. Either the flexible member or the body is configured for attachment to two vehicle frame members so as to interconnect the frame members relative to each other and so as to facilitate movement of one of the frame members relative to the other of the frame members substantially according to the desired bending defined by the body and substantially without torsion.

43 Claims, 3 Drawing Sheets

5,865,456
Page 2

U.S. PATENT DOCUMENTS

| | | | |
|---|---|---|---|
| 578,615 | 3/1897 | Travis . | |
| 606,323 | 6/1898 | Wronksi . | |
| 657,667 | 9/1900 | Mills . | |
| 944,795 | 12/1909 | Leet et al. . | |
| 1,047,430 | 12/1912 | Michaelson . | |
| 1,201,728 | 10/1916 | Henry et al. . | |
| 1,257,761 | 2/1918 | Strand . | |
| 1,298,958 | 4/1919 | Johnston . | |
| 1,412,012 | 4/1922 | Bruno . | |
| 1,594,079 | 7/1926 | Tanner . | |
| 2,732,005 | 1/1956 | Corning . | |
| 3,522,957 | 8/1970 | Topor | 280/283 |
| 3,917,313 | 11/1975 | Smith et al. | 280/284 |
| 3,982,770 | 9/1976 | Satoh et al. | 280/284 |
| 4,322,088 | 3/1982 | Miyakoshi et al. | 280/284 |
| 4,421,337 | 12/1983 | Pratt | 280/277 |
| 4,506,755 | 3/1985 | Tsuchida et al. | 180/227 |
| 4,507,011 | 3/1985 | Brown | 244/132 |
| 4,529,056 | 7/1985 | Kreuz | 180/227 |
| 4,673,053 | 6/1987 | Tanaka et al. | 180/227 |
| 4,679,811 | 7/1987 | Shuler | 280/284 |
| 4,789,174 | 12/1988 | Lawwill | 280/284 |
| 4,869,552 | 9/1989 | Tolleson et al. | 297/296 |
| 4,951,791 | 8/1990 | Belil Creixell | 180/219 |
| 4,997,197 | 3/1991 | Shultz | 280/275 |
| 5,080,384 | 1/1992 | Groendal et al. | 280/175 |
| 5,098,114 | 3/1992 | James | 280/284 |
| 5,121,937 | 6/1992 | Lawwill | 280/284 |
| 5,205,572 | 4/1993 | Buell et al. | 280/284 |
| 5,244,224 | 9/1993 | Busby | 280/284 |
| 5,259,637 | 11/1993 | Busby | 280/284 |
| 5,269,552 | 12/1993 | Yelverton | 280/283 |
| 5,306,036 | 4/1994 | Busby | 280/284 |
| 5,409,249 | 4/1995 | Busby | 280/284 |
| 5,441,292 | 8/1995 | Busby | 280/284 |
| 5,445,471 | 8/1995 | Wexler et al. | 403/220 |

OTHER PUBLICATIONS

Guide to Suspension and High Performance; "Suspension Speak"; vol. 3, 1992; pp. 9, 13–15, 17, 30–31, 36–37, 42–45, 47, 53, 60, 69, 71, 76, 85–87, 92, 96, 98, 100, 108–112, 117 and 119.

1992 Cannondale Specs.; "Suspension Mountain Bicycles"; 4 pgs.

TREK 900 Series Specs.; "This Beauty Is A Beast"; 3 pgs.

Mountain Bike Action; Mar. 1992; "Fisher RS–1"; 4 pgs.

Mountain Bike Action; Feb. 1992; "Suspension Mania Strikes Cycling"; 3 pgs.

Mountain Bike Action; "Boulder Intrepid AL"; 2 pgs.

Mountain Bike Action; Jul. 1992; "Team ShockBlok"; 5 pgs.

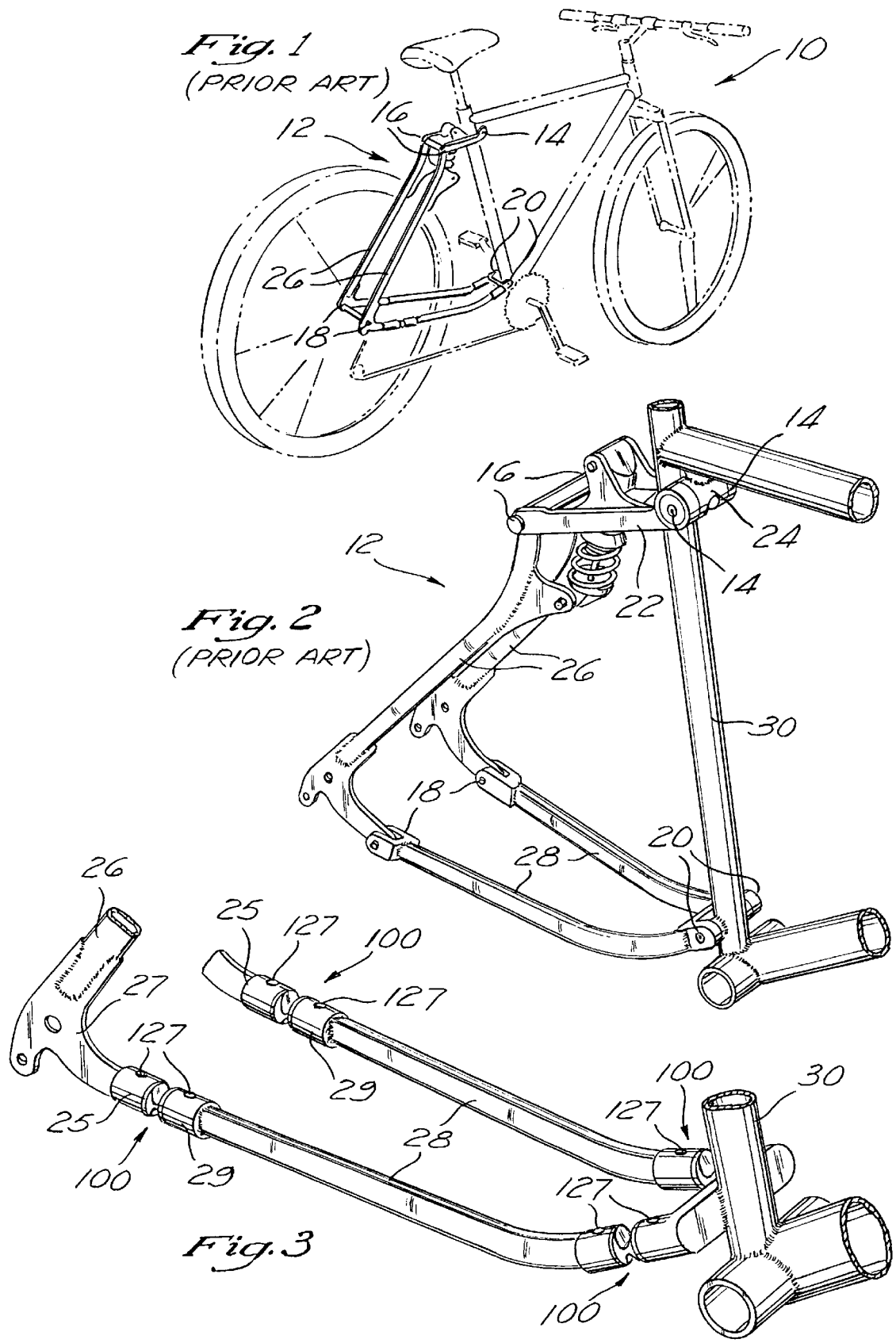

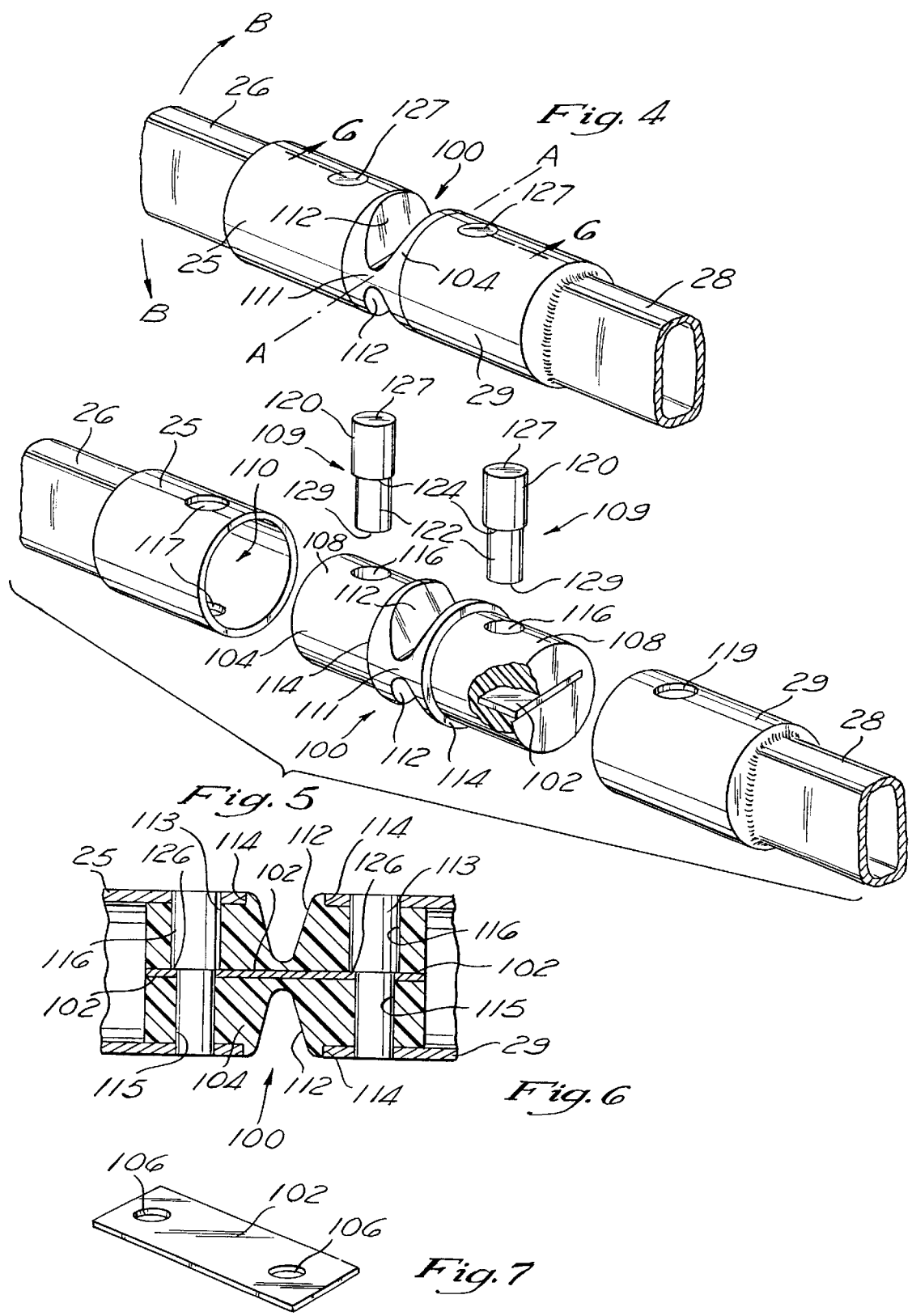

BICYCLE FLEX JOINT WITH NON-TORSIONAL ENCASEMENT

CROSS-REFERENCE TO RELATED APPLICATION

This application is a continuation-in-part of patent application Ser. No. 08/662,249 filed Jun. 14, 1996 now U.S. Pat. No. 5,797,613.

FIELD OF THE INVENTION

The present invention relates generally to bicycle frame construction and more particularly to a flex joint for allowing bicycle frame members to flex about one particular axis while mitigating flexing about all other axes and while also mitigating torsion of the frame members relative to one another.

BACKGROUND OF THE INVENTION

The primary structural component of a bicycle is the bicycle frame. Typically, the bicycle frame comprises an elongate top tube which is rigidly secured to and extends between a head tube of the bicycle and a seat tube of the bicycle. The head tube typically provides a structural base for the stem of the bicycle to which the handle bars are attached. The seat tube provides a base for a seat post which is generally telescopically received therewithin and to which is secured the saddle or seat of the bicycle. In typical bicycle frame construction, the seat tube includes a generally cylindrical axle-receiving bracket attached to the lower end thereof which is adapted to receive the bottom bracket axle. The bottom bracket axle typically extends between and interconnects the cranks to which are attached the pedals. Rigidly secured to and extending between the head tube and the cylindrical axle-receiving bracket is an elongate down tube.

In addition to the aforementioned structural components, rigidly secured to and extending rearwardly from the axle-receiving bracket are first and second chain stay members. Additionally, rigidly secured to and extending downwardly from the upper end of the seat tube are first and second seat stay members having lower ends which are rigidly secured to the back ends of the first and second chain stay members. Typically, the lower ends of the seat stay members and back ends of the chain stay members are interconnected in a manner adapted to receive the rear tire axle of the rear wheel. The head tube, seat tube, top tube, and down tube are typically secured to each other and to the axle-receiving bracket in a manner defining a main front triangle portion of the bicycle frame. The seat stay and chain stay members, when connected to the seat tube, axle-receiving bracket, and each other, typically define a back triangle portion of the bicycle frame.

The foregoing description generally represents the construction of conventional prior art bicycle frames. Typically, when such prior art frames are constructed, the aforementioned structural components are rigidly secured to one another through the use of welding or bracing techniques. Though this method of constructing the bicycle frame provides the resulting frame with structural integrity, the bicycle frame does not possess a suspension having shock absorbing characteristics. As will be recognized, the ride, comfort, and performance of the bicycle would be greatly enhanced if the bicycle frame were adapted to at least partially accommodate the shocks routinely encountered while riding the bicycle.

Though recent prior art bicycle frames include front and/or rear shock absorbing assemblies, such bicycle frames possess certain deficiencies which detract from their overall utility. In most prior art rear shock absorbing assemblies, the rear axle pivots about a single elevated pivot point when subjected to a shock force which generally results in the rear wheel axle moving upwardly in an arc rather than moving vertically upward in a substantially linear fashion.

Typically, if the rear wheel axle is caused to move arcuately due to the absorption of a bump or shock force by the rear tire, the bicycle frame will normally rise and fall a few times due to suspension oscillations after the obstacle or obstruction has been cleared by the rear tire. This bouncing action which occurs at a frequency attendant to the structure of the rear shock absorbing assembly will typically require the rear tire to speed up and slow down as it keeps up with the bicycle's constant velocity, since the wheel base of the bicycle is changing as the rear wheel axle moves arcuately back to its original position. This constant changing of the rear tire's angular velocity requires energy due to the effects on the rear tire's angular momentum, thus diminishing riding efficiency.

Further, the rear shock absorbing assemblies are typically mounted directly to the main front triangle portion of the bicycle frame, and are configured in a manner which results in the amount of rear wheel travel being greater or less than the amount of shock absorber travel when a shock force is applied to the rear wheel. In certain prior art rear shock-absorbing assemblies, less and less additional force is required to compress the shock absorber of the assembly for each equal increment in rear wheel movement due to the mechanical advantage of the shock absorber over the rear wheel decreasing throughout the rear wheel travel. This type of suspension wherein the wheel rate is regressive is generally undesirable due to the tendency of the shock absorber to "bottom-out". Other prior art rear shock absorbing assemblies are configured in a manner so as to achieve a progressive wheel rate wherein more and more additional force is needed to compress the shock absorber for each equal increment in rear wheel movement. Though a progressive wheel rate is more desirable than a regressive wheel rate, optimal performance of the bicycle is achieved with a flat wheel rate wherein the ratio of movement, i.e. the motion ratio, between the shock absorber and the rear wheel is constant throughout the range of vertical travel of the rear wheel.

In addition to the foregoing, the mounting of the shock absorber assembly to the main front triangle portion of the bicycle frame sometimes results in the force of the shock being transmitted directly to the main front triangle portion of the bicycle frame as bending moments or torque which adversely affects the overall smoothness of the bicycle ride. As such, a much more smooth and even ride would be obtained if the shock absorber assembly was not mounted directly to the main front triangle portion of the bicycle frame, and was configured to provide a flat rate of rear wheel travel.

The use of such a bicycle rear suspension system is described in more detail in U.S. Pat. No. 5,441,292 issued on Aug. 15, 1995 to Busby and entitled "Bicycle Rear Suspension System", the contents of which are hereby incorporated by reference.

Although bicycle frames utilized for such rear suspension systems have proven generally suitable for their intended purpose, they possess inherent deficiencies which detract from their overall desirability and effectiveness in the marketplace. As those skilled in the art will appreciate, such contemporary bicycle frames utilize pivot or flex joints which generally comprise a pivot pin which extends through apertures formed at the frame member ends to be so joined. Although such construction does provide flexing along a desired axis while mitigating flexing along other axes and also mitigates torsion of the two frame members relative to one another, such construction necessitates the forming of apertures at the frame ends to be joined. Each aperture must be machined into a solid member or lug which is generally welded to the tubular frame member. Typically, this is done to both framed members to be so joined, so as to define a clevis. Such construction methodology inherently requires precision tooling and skilled labor. Thus, flex joints formed according to such contemporary methodology are costly and comparatively difficult to fabricate. Such prior art joints also have an inherent need for maintenance such as cleaning and lubrication. Also, such prior art flex joints are susceptible to contamination, particularly since bicycles are commonly used in environments where they are exposed to various environmental contaminants such as dirt, sand, debris, etc.

As such, it is beneficial to provide a flex joint for a bicycle frame which facilitates flexing about a single desired axis while mitigating flexing about all other axes, as well as mitigating torsion of the interconnected frame members relative to one another, and which also does not require substantial maintenance, is inexpensive to manufacture, and which facilitates easy assembly of the bicycle frame.

SUMMARY OF THE INVENTION

The present invention specifically addresses and alleviates the above-mentioned deficiencies associated with the prior art. More particularly, the present invention comprises a flex joint for pivotally attaching two bicycle frame members to one another. The flex joint comprises a flexible member comprised of a durable material, and a body formed upon the flexible member and configured to define a desired bending of the flexible member. The flexible member and/or the body are configured for attachment to two vehicle frame members, so as to interconnect the frame members, and so as to facilitate movement of one frame member relative to the other frame member substantially only along a desired axis. The flex joint of the present invention preferably mitigates bending of the frame members relative to one another in all other axes and also mitigates torsion of one frame member relative to another, as discussed in detail below.

The flexible member preferably comprises a plate, preferably a plate comprised of a flexible metal such as steel. Alternatively, the flexible member may be comprised of a composite material such as fiberglass, graphite, etc. Those skilled in the art will appreciate that various other materials are likewise suitable.

According to the preferred embodiments of the present invention, the body generally surrounds the flexible member. The body is configured so as to facilitate bending of the flexible member substantially about only a single axis thereof, so as to generally mimic the kinematics of a prior art pivot joint.

The body preferably comprises a comparatively rigid and durable polymer material, such as nylon. Those skilled in the art will appreciate that various other polymers, as well as other materials, are likewise suitable.

The body preferably comprises two notches formed in opposite sides thereof, i.e., upon opposite surfaces of the flexible member or plate, so as to define a neck through which the flexible member extends. Thus, the notches facilitate bending of the flexible material about an axis which extends longitudinally through the neck and transverse to the flex joint itself, while the body tends to inhibit bending along all other axes and also inhibits torsion. Thus, the flex joint of the present invention functions in a manner similar to that of a living hinge, with one exception being that undesirable bending and torsion are mitigated.

Configuring the flexible material as a plate assures that the flex joint bends only in the desired direction, along the longitudinal axis of the neck and notches, since such a plate does not bend substantially along the other axes thereof.

As mentioned above, the body and the flexible member of the present invention cooperate so as to mitigate torsion, i.e. twisting of one frame member relative to another. Thus, the flex joint of the present invention functions in a manner analogous to that of a prior art pivot joint. Optionally, a longitudinally flexible, substantially non-twistable encasement can surround the site where the joint bends to thereby even more effectively eliminate joint torsion while simultaneously freely enabling joint bending along the desired longitudinal axis.

According to the preferred embodiment of the present invention, each flex joint is attached at the two ends thereof to the bicycle frame members to be so joined via insertion of a portion of the ends of the flex joint into complimentary openings formed in the ends of the frame members. Preferably, a shoulder pin is inserted through the frame members and the ends of the flex joints so as to secure the flex joint and the frame members together. Those skilled in the art will appreciate the various other means, i.e., welding, brazing, soldering, adhesive bonding, threading, and/or various fasteners, are likewise suitable for attaching the flex joints to the frame members.

Preferably, a bore is formed through both the body and the flexible member at each end of each of the flex joints to accommodate the shoulder pins. A portion of the bore has a reduced diameter, so as to define an internal shoulder. The internal shoulder functions as a stop by abutting a complimentary shoulder formed upon the shoulder pins, so as to properly position the shoulder pins within the bores. Various means, i.e., welding, brazing, soldering, threading, adhesive bonding, and/or various fasteners, may be utilized to secure the shoulder pins within the bores.

The flex joint of the present invention is preferably formed by injection molding the nylon body about a steel insert placed within the mold prior to injection of the nylon. Thus, the nylon body is formed about and adheres to the steel plate, thereby forming an integral or one-piece flex joint. The bores may either be formed in the body during the injection molding process, or may be machined therein afterwards. Similarly, that portion of the bores extending through the metal plate may either be formed within the metal plate prior to the injection molding process, or may be machined therein after molding.

Thus, according to the present invention, a flex joint is provided which permits bending of one frame member relative to another about a desired axis while substantially mitigating bending about all other axes and also substantially mitigating undesirable torsions. The flex joint of the present invention is essentially maintenance free. It does not require periodic lubrication and is not particularly susceptible to environmental contamination. The flex joint is easily and quickly attachable to the frame and removable therefrom, so as to facilitate convenient replacement, if desired.

Further, the flex joint of the present invention is sufficiently durable to withstand the rugged conditions commonly encountered in all terrain and/or mountain riding.

These, as well as other advantages of the present invention, will be more apparent from the following description and drawings. It is understood that changes in the specific structure shown and described may be made within the scope of the claims without departing from the spirit of the invention.

BRIEF DESCRIPTION OF THE DRAWINGS

FIG. 1 is a perspective view of a bicycle utilizing pivot joints to effect desired bending of the frame members with respect to one another according to the prior art;

FIG. 2 is an enlarged perspective view of a portion of the prior art bicycle frame of FIG. 1, better showing the pivot joints thereof;

FIG. 3 is a perspective view of a portion of a bicycle frame utilizing flex joints of the present invention to interconnect frame members thereof;

FIG. 4 is an enlarged perspective view of a flex joint of the present invention interconnecting adjacent frame members;

FIG. 5 is an exploded view of the flex joint and frame members of FIG. 4;

FIG. 6 is a cross-sectional side view of the flex joint of the present invention taken along lines 6 of FIG. 4;

FIG. 7 is a perspective view of the resilient member or metal plate of the present invention;

DETAILED DESCRIPTION OF THE PREFERRED EMBODIMENT

Figure 8:
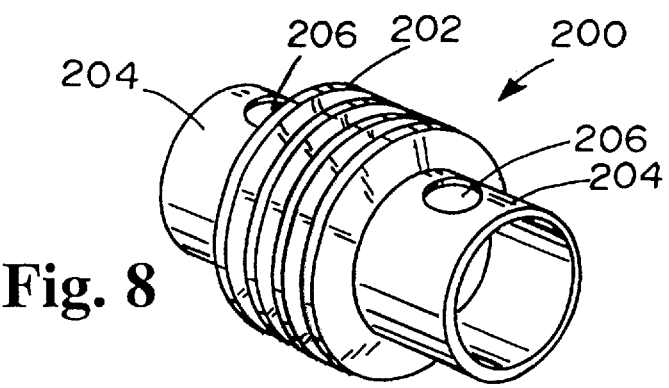
FIG. 8 is a perspective view of a non-twistable encasement to surround the site where the flex joint of FIGS. 3–6 bends.

The detailed description set forth below in connection with the appended drawings is intended as a description of the presently preferred embodiment of the present invention, and is not intended to represent the only form in which the present invention may be constructed or utilized. The description sets forth the functions and the sequence of steps for constructing and operating the invention in connection with the illustrated embodiment. It is to be understood, however, that the same or equivalent functions may be accomplished by different embodiments that are also intended to be encompassed within the spirit and scope of the invention.

The flex joint of the present invention is illustrated in FIGS. 3–7 which depict a presently preferred embodiment of the invention. FIGS. 1 and 2 depict a bicycle frame utilizing prior art pivot joints.

Referring now to FIGS. 1 and 2, the bicycle 10, having a rear suspension system 12, utilizes pivot joints 14, 16, 18, and 20 to facilitate movement or bending of frame members with respect to one another, so as to effect suspension of the rear wheel.

More particularly, the upper link 22 is pivotally attached to the link mount 24 via pivot joint 14, the seat stay members 26 are pivotally attached to the upper link 22 via pivots 16, the chain stay members 28 are pivotally attached to the seat stay members via pivots 18, and the chain stay members 28 are pivotally attached to the seat tube 30 via pivot joints 20.

In this manner, the rear suspension system 12 functions as described in U.S. Pat. No. 5,441,292, incorporated by reference above.

Referring now to FIGS. 3–5, according to the present invention flex joints 100 pivotally or flexibly attach seat stay members 26 to chain stay members 28. Similarly, flex joints 100 pivotally or flexibly attach chain stay members to seat tube 30. Interconnection of the seat stay 26 with the chain stay 28 utilizing the flex joint 100 of the present invention is by way of illustration only, and not by way of limitation.

As used herein, when we speak of the attachment of two frame members to one another, it is understood that such attachment may either be direct or through intermediate members such as brackets, flanges, or axle receiving members 27. As those skilled in the art will appreciate, various such intermediate members, brackets, or flanges are commonly utilized to attach joining frame members to one another and various different such frame configurations are thus suitable. Thus, as used herein, the term seat stay member shall include the axle receiving bracket 27 attached thereto.

Further, those skilled in the art will appreciate that the flex joint 100 of the present invention may similarly be utilized to attach various other frame members of a bicycle to one another, as desired.

Referring now to FIGS. 4–7, the flex joint of the present invention generally comprises a flexible member or plate 102 (best shown in FIG. 7), upon which the body 104 is formed. According to the preferred of the present invention, the plate 102 comprises an elongate member having two apertures 106 formed near the ends thereof. The plate 102 preferably comprises metal, preferably steel, so as to be durable and flexible. The dimensions and material of the plate are selected so as to provide a desired amount of flexibility.

According to the preferred embodiment of the present invention, the body 104 comprises ends 108, each of which are generally circular in cross section, so as to be complimentary to and fit within the generally circular openings 110 of the seat stay 16 and chain stay 28.

As shown in FIGS. 3–5, circular frame end members 25 and 29 are welded or otherwise formed or attached at the ends of the seat stay members 26 and the chain stay members 28, respectively, so as to receive the circular ends 108 of the flex joints 100. Those skilled in the art will appreciate that the ends 108 of the flex joint 100 could alternatively have been formed so as to be received within the non-circular ends of the seat stay member 26 and chain stay member 28 directly. Thus, those skilled in the art will appreciate that various other cross sectional configurations of the ends 108 of the body 104 are likewise suitable. For example, the ends 108 of the body 104 may be configured to have an oval, square, rectangular, triangular, or any other cross sectional configuration which is generally complimentary to similarly configured frame members.

The body 104 further comprises notches 112, preferably proximate the center portion thereof and on opposite sides of the plate 102, so as to define the desired bending of the plate 102. Each notch 112 allows the flex joint 100 to bend in a manner which tends to close that notch 112. Thus, the two notches 112 allow the flex joint 100 to bend in two opposite directions about axis A, the longitudinal axis of the notches and the neck, as shown in FIG. 4. Such movement allows the seat stay member 26 to move along arc B relative to the chain stay member 28, for example. Thus, the seat stay member 26 flexes or pivots about axis A.

Further, according to the preferred embodiment of the present invention, shoulders 114 formed upon the ends 108 of the body 104 limit insertion of the ends 108 into the seat stay member 26 and the chain stay member 28, so as to assure that the flex joint 100 is properly attached thereto, i.e., properly seated therein.

According to the preferred embodiment of the present invention, the body 104 further comprises bores 116 formed through the ends 108 thereof and coextensive with openings 106 formed in the plate 102, such that shoulder pins 109 are insertable through the openings 117 formed in the circular ends 25 of the seat stay tubes 26 and openings 119 formed in the circular ends 29 of the chain stay members 28. Thus, each flex joint 100 is removably attached to the seat stay member 26 and the chain stay member 28.

The flex joint 100 is preferably removably attachable to the seat stay member 26 and the chain stay member 28, so as to facilitate removal and replacement thereof, as desired. As discussed above, various other means for attaching the flex joint 100 to the seat stay member 26 and the chain stay member 28 are likewise suitable.

Each shoulder pin 109 (FIG. 5) comprises an area of greater diameter 120 and an area of lesser diameter 122, so as to define a shoulder 124 which configured to abut the shoulder 126 similarly formed by the portion of greater diameter 113 and the portion of lesser diameter 115 within each bore 116 of the flex joint 100, thereby properly positioning the shoulder pins 109 so as to facilitate attachment of the flex joint 100 to the seat stay member 26 and the chain stay member 28. The shoulder 126 may be defined by either the material of which the body 104 is comprised, or more preferably, by the plate 102. Thus, the shoulder 124 of the each shoulder pin 109 may abut either the steel plate 102 or the nylon body 104. Preferably, the shoulder pins 109 have curved upper 127 and curved lower 129 surfaces, so as to sit flush with and conform to the outer curved surface of the seat stay member 26 and the chain stay member 28, thereby providing an aesthetically pleasing finish.

Figure 9:
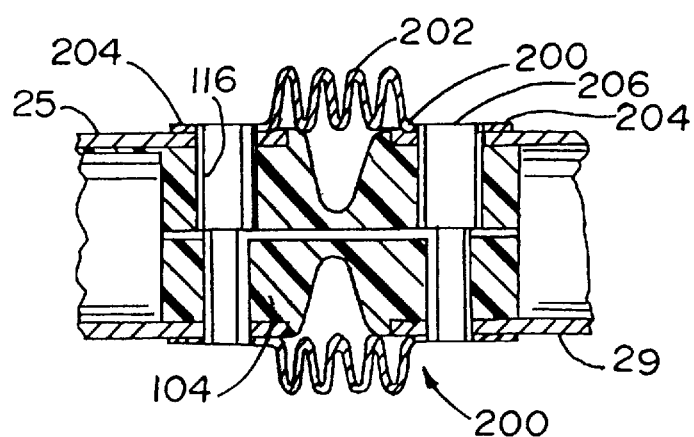
FIG. 9 is a side elevation view in section of the non-twistable encasement of FIG. 8 surrounding the site where the flex joint of FIGS. 3–6 bends.

FIGS. 8 and 9 show a substantially non-twiststable encasement 200 which can be included as part of the flex joint 100 to substantially eliminate joint torsion. The encasement 200 has a central bellows 202 that surrounds the site where the joint bends about axis A (FIG. 3), and is preferably constructed of spring steel to thereby freely enable the joint to bend longitudinally while prohibiting twisting motion. While spring steel is preferred, it is, of course, understood that other materials can be chosen so long as the non-twisting functionality thereof is substantially similar to the steel. Extending in each direction from the bellows 202 are respective tubular ends 204 each having respective apertures 206. As illustrated in FIG. 9, the tubular ends 204 each extend laterally such that the apertures 206 thereof are in alignment with the bores 116 of the flex joint 100 to thereby be securable by the shoulder pins 109. In operation, the encasement 200 substantially eliminates torsional movement of the flex joint 100 to thereby provide enhanced connection stability between frame members.

As such, the present invention provides a less costly and easier to assemble replacement for contemporary pivot joints. It also provides an excellent means for mitigating undesirable bending and/or torsion of one frame member with respect to another while simultaneously facilitating bending of the frame member along a desired axis with respect to one another. The flex joint of the present invention requires less maintenance than contemporary pivot joints utilizing pivot pins. That is, it does not require periodic lubrication and is not susceptible to environmental contamination.

Further, the flex joint of the present invention is easily removable, such that it may be readily replaced if damaged during use. The present invention is rugged enough to withstand the substantial forces applied during peddling and riding, particularly in the rugged conditions frequently encountered in all terrain and/or mountain riding.

It is understood that the exemplary flex joint described herein and shown in the drawings represents only a presently preferred embodiment of the invention. Indeed, various modifications and additions may be made to such embodiment without departing from the spirit and scope of the invention. For example, the flexible member may be of various different configurations, so as to provide the desired degree rigidity and flexibility. Further, as those skilled in the art will appreciate, various different combinations of materials are suitable for use as the flexible member and the body. Indeed, it is contemplated that the resilient member and the body may be comprised of a common material. Thus, these and other modifications and additions may be obvious to those skilled in the art and may be implemented to adapt the present invention for use in a variety of different applications.

What is claimed is:

1. A flex joint for a vehicle frame, said flex joint comprising:
   (a) a flexible member comprised of a durable material;
   (b) a body formed upon said flexible member and configured to define a desired bending of said flexible member at a bending site;
   (c) a longitudinally flexible, substantially non-twistable encasement surrounding the bending site; and
   (d) a bore formed through said flexible member and said body proximate each of two ends thereof such that a fastener is insertable through each bore to attach said flex joint to two vehicle frame members, so as to interconnect said frame members and so as to facilitate movement of one of said frame members relative to the other of said frame members substantially according to the desired bending defined by said body.

2. The flex joint as recited in claim 1 wherein said flexible member comprises a plate.

3. The flex joint as recited in claim 1 wherein said flexible member comprises a plate comprised of metal.

4. The flex joint as recited in claim 1 wherein said flexible member comprises a plate comprised of a composite material.

5. The flex joint as recited in claim 1 wherein said body generally surrounds said flexible member.

6. The flex joint as recited in claim 1 wherein said flexible member comprises a plate and wherein said body is configured to facilitate bending of said plate substantially about only a single axis thereof.

7. The flex joint as recited in claim 1 wherein said body comprises two notches formed in opposite sides thereof, so as to define a neck through which said flexible member extends.

8. The flex joint as recited in claim 1 wherein the two bores each comprise a portion of reduced diameter defining a shoulder, said shoulder functioning as a stop so as to position pins having complimentary shoulders inserted therethrough.

9. The flex joint as recited in claim 1 wherein said body is formed about said flexible member by using said flexible member as an insert when injection molding said body.

10. The flex joint as recited in claim 1 wherein said body comprises a substantially rigid polymer material.

11. The flex joint as recited in claim 1 wherein said body comprises nylon.

12. A flex joint for flexibly attaching two bicycle frame members to one another, said flex joint comprising:
   (a) an elongate flexible metal plate;
   (b) a substantially rigid polymer body generally surrounding said plate and having a pair of notches formed transversely therein upon opposite sides of said plate, so as to define a neck, said neck defining an axis about which the flex joint bends, said body having two ends, the ends having cross sections generally complimentary to the two bicycle frame members such that the ends are insertable into the two bicycle frame members;
   (c) a longitudinally flexible, substantially non-twistable encasement having a central portion of a bellows configuration surrounding the neck;
   (d) two pins for attaching said flex joint to the two bicycle frame members, each pin having a shoulder formed thereon;
   (e) a bore formed through said body and said plate at each end of said body, said bore comprising a portion of reduced diameter defining a shoulder, said shoulder functioning as a stop by abutting the shoulder formed upon said pin when said pin is inserted into said bore; and
   (f) wherein said flex joint facilitates bending of the two bicycle frame members with respect to one another substantially only about a desired axis and mitigates torsion of each bicycle frame member with respect to the other.

13. A bicycle frame having a rear suspension linkage system, said frame comprising:
   (a) a pair of rear wheel axle receiving members;
   (b) a pair of chain stays;
   (c) a seat tube;
   (d) a first pair of flex joints for flexibly attaching each of said rear wheel axle receiving members to one chain stay;
   (e) a second pair of flex joints for flexibly attaching each of said chain stays to said seat tube;
   (f) wherein said first and second flex joints each comprise:
      (i) a flexible member comprised of a durable material;
      (ii) a body formed upon said flexible member and configured to define a desired bending of said flexible member at a bending site; and
      (iii) a longitudinally flexible, substantially non-twistable encasement surrounding the bending site; and
      (iv) wherein at least one of said flexible member and said body is configured for attachment to two vehicle frame members, so as to interconnect said frame members and so as to facilitate movement of one of said frame members relative to the other of said frame members substantially according to the desired bending defined by said body.

14. The bicycle frame as recited in claim 13 wherein said flexible member comprises a plate.

15. The bicycle frame as recited in claim 13 wherein said flexible member comprises a plate comprised of metal.

16. The bicycle frame as recited in claim 13 wherein said flexible member comprises a plate comprised of a composite material.

17. The bicycle frame as recited in claim 13 wherein said body generally surrounds said flexible member.

18. The bicycle frame as recited in claim 13 wherein said flexible member comprises a plate and wherein said body is configured to facilitate bending of said plate substantially about only a single axis thereof.

19. The bicycle frame as recited in claim 13 wherein said body comprises two notches formed in opposite sides thereof, so as to define a neck through which said flexible member extends.

20. The bicycle frame as recited in claim 13 further comprising a bore formed through said body and said flexible member proximate each of two ends thereof, such that a fastener is insertable through each bore to attach said flex joint to the two vehicle frame members.

21. The bicycle frame as recited in claim 20 wherein the two bores each comprise a portion of reduced diameter defining a shoulder, said shoulder functioning as a stop so as to position pins having complimentary shoulders inserted therethrough.

22. The bicycle frame as recited in claim 13 wherein said body is formed about said flexible member by using said flexible member as an insert when injection molding said body.

23. The bicycle frame as recited in claim 13 wherein said body comprises a substantially rigid polymer material.

24. The bicycle frame as recited in claim 13 wherein said body comprises nylon.

25. The bicycle frame as recited in claim 13 wherein the encasement is constructed of metal.

26. The bicycle frame as recited in claim 25 wherein a central portion of the encasement has a bellows configuration.

27. The bicycle frame as recited in claim 26 wherein the metal is spring steel.

28. A flex joint for a vehicle frame, said flex joint comprising:
   (a) a flexible member comprised of a durable material;
   (b) a body formed upon said flexible member and configured to define a desired bending of said flexible member at a bending site;
   (c) a longitudinally flexible, substantially non-twistable metal encasement surrounding the bending site; and
   (d) wherein at least one of said flexible member and said body is configured for attachment to two vehicle frame members, so as to interconnect said frame members and so as to facilitate movement of one of said frame members relative to the other of said frame members substantially according to the desired bending defined by said body.

29. The flex joint as recited in claim 28 wherein a central portion of the encasement has a bellows configuration.

30. The flex joint as recited in claim 29 wherein the metal is spring steel.

31. A method for forming a flex joint for use in vehicle frames, said method comprising the steps of:
   (a) providing a flexible member comprised of a durable material;
   (b) forming a body upon said flexible member, said body being configured to define a desired bending of said flexible member at a bending site;
   (c) providing a longitudinally flexible, substantially non-twistable metal encasement surrounding the bending site; and
   (d) wherein at least one of said flexible member and said body is configured for attachment to two vehicle frame members, so as to interconnect said frame members and so as to facilitate movement of one frame member relative to the other substantially according to the desired bending defined by said body.

32. The method as recited in claim 31 wherein a central portion of the encasement has a bellows configuration.

33. The method as recited in claim 32 wherein the metal is spring steel.

34. A method for forming a flex joint for use in vehicle frames, said method comprising the steps of:

(a) providing a flexible member comprised of a durable material;

(b) forming a body upon said flexible member, said body being configured to define a desired bending of said flexible member at a bending site;

(c) providing a longitudinally flexible, substantially non-twistable encasement surrounding the bending site; and (d) forming a bore through said flexible member and said body proximate each of two ends thereof such that a fastener is insertable through each bore to attach said flex joint to two vehicle frame members, so as to interconnect said frame members and so as to facilitate movement of one frame member relative to the other substantially according to the desired bending defined by said body.

35. The method as recited in claim 34 wherein the step of providing a flexible member comprises providing a flexible member configured as a plate.

36. The method as recited in claim 34 wherein the step of providing a flexible member comprises providing a flexible member comprised of metal.

37. The method as recited in claim 34 wherein the step of providing a flexible member comprises providing a plate comprised of a composite material.

38. The method as recited in claim 34 wherein the step of forming a body upon said flexible member comprises forming a body generally surrounding said flexible member.

39. The method as recited in claim 34 wherein the step of forming a body upon said flexible member comprises forming a body upon a plate, such that the body is configured to facilitate bending of the plate substantially about only a single axis thereof.

40. The method as recited in claim 34 wherein the step of forming a body upon said flexible member comprises forming a body having two notches formed in opposite sides thereof, so as to define a neck through which said flexible member extends.

41. The method as recited in claim 34 wherein the step of forming each bore comprises forming each bore to have a portion of reduced diameter defining a shoulder, said shoulder functioning as a stop so as to position pins having complimentary shoulders inserted therethrough.

42. The method as recited in claim 34 wherein the step of forming a body upon said flexible member comprises forming a body comprised of a substantially rigid polymer material upon said flexible member.

43. The method as recited in claim 34 wherein the step of forming a body upon said flexible member comprises forming a body comprised of nylon upon said flexible member.

* * * * *